United States Patent [19]

Ogawa

[11] Patent Number: 4,955,110
[45] Date of Patent: Sep. 11, 1990

[54] APPARATUS FOR COLLECTING ROE

[75] Inventor: Yutaka Ogawa, Ibaraki, Japan

[73] Assignee: Nippon Fillestar Co., Ltd., Osaka, Japan

[21] Appl. No.: 376,596

[22] Filed: Jul. 7, 1989

[30] Foreign Application Priority Data

May 12, 1989 [JP] Japan .................. 1-120174

[51] Int. Cl.⁵ .................................. A22C 25/14
[52] U.S. Cl. .................................. 17/53; 17/55; 17/58
[58] Field of Search .................. 17/53, 55, 63, 58, 45

[56] References Cited

U.S. PATENT DOCUMENTS

| 3,793,676 | 2/1974 | Wiggins | 17/45 |
| 3,925,846 | 12/1975 | Leander | 17/58 |
| 4,332,057 | 6/1982 | Smith | 17/55 |
| 4,563,793 | 1/1986 | Ryan | 17/58 |
| 4,630,355 | 12/1986 | Claudon | 17/58 |

FOREIGN PATENT DOCUMENTS

3233746 9/1988 Japan .................. 17/58

Primary Examiner—Willis Little
Attorney, Agent, or Firm—Wenderoth, Lind & Ponack

[57] ABSTRACT

An apparatus for collecting roe has a conveyor which grips decapitated fish bodies in a lying position, with the tails of the fish bodies set in one common direction. A plurality of projections are provided on the conveyor for holding the fish bodies in this position. The abdomens of the fish bodies are directed downstream with respect to the conveying direction. A roe collector is provided adjacent the conveyor. A collecting member abuts against the abdomens of the fish bodies as the fish bodies are conveyed by the fish body conveyor. This collecting member rotates and is driven about a rotational axis which extends in a direction crossing with the conveying direction. The collecting member is further thrust elastically upstream in the conveying direction to contact the tail ends of the fish bodies. The decapitated fish bodies are thereby conveyed by the conveyor in a fixed position due to the holding projections. The roe collector abuts against the abdomens of the fish bodies while the fish bodies are conveyed along the conveying path, and the abdomens of the fish bodies are elastically pressed upstream while the collecting member rotates to push out the ovaries of the abdominal cavity of the fish body.

6 Claims, 8 Drawing Sheets

APPARATUS FOR COLLECTING ROE

BACKGROUND OF THE INVENTION

1. Field of the Invention

The present invention relates to improvements in apparatus for collecting roe, capable of continuously removing roe without damage by chopping off the head of a fish in order to collect the roe of, for example, Alaska pollack.

2. Description of the Prior Art

A typical conventional apparatus for collecting roe is arranged so as to convey fish bodies on a conveyor belt, position the head ends of the fish bodies at a fixed position along the head-tail direction of the fish bodies on the conveyor, chop off the heads of the fish bodies, and press the abdomen of the decapitated fish bodies with a pressing member to remove the ovaries.

According to the prior art discussed above, the length in the head-tail direction of the head part of the fish bodies varies with the size of the fish bodies, and the chopping position differs, or the fish body may be chopped obliquely, to damage the ovaries, or removal of the ovaries may be unstable.

SUMMARY OF THE INVENTION

It is hence a primary object of the invention to solve the above problems, and provide an apparatus for collecting roe capable of removing the ovaries smoothly and securely without damaging the ovaries, regardless of the size of the fish bodies, and also increase the process speed.

The present invention provides an apparatus for collecting roe which comprises a conveying means for gripping and conveying decapitated fish bodies in a lying position with the tails of the fish bodies extending in a common direction and with the abdomens of the fish bodies facing downstream with respect to the direction of conveyance of the conveying means for gripping and conveying. The conveying means for gripping and conveying further comprises a stopping means for holding the fish bodies stationary in their lying position.

A collecting means is provided for collecting the roe from the fish bodies conveyed by the conveying means. The collecting means comprises a collecting member for abutment against the abdomens of the fish bodies, the collecting member being rotatable and drivable about a rotation axis extending across the direction of conveyance of the conveying means. The collecting member further is elastically biased upstream, with respect to the direction of conveyance.

More specifically, the present invention provides an apparatus for collecting roe which has a means for gripping and conveying the fish bodies in a lying position, with their abdomens directed downstream in the conveying direction, and the area of the root of the pectoral fin positioned at a predetermined chopping position in the head-tail direction. A means for pressing the abdomen is disposed adjacent the gripping and conveying means, and is thrust elastically upstream of the conveying direction so as to press the abdomens of the fish bodies near their pectoral fins to dislocate the ovaries toward the tails of the fish bodies within the abdominal cavity. A means for chopping is also disposed adjacent the gripping and conveying means, and is designed to chop off the heads of the fish bodies near the root of the pectoral fin while the abdomens are pressed by the abdomen pressing means. A means for collecting roe is then disposed by the gripping and conveying means, and is elastically thrust upstream with respect to the conveying direction of the fish bodies so as to press the tail side of the abdomens of the decapitated fish bodies to take out the ovaries from the fish bodies.

The invention further provides an apparatus for collecting roe comprising means for positioning and conveying which mounts and conveys the fish bodies in the lying position with their abdomens directed downstream, in the conveying direction, at the upstream side of the gripping and conveying means. This positioning and conveying means comprises a plurality of mounting members disposed in the conveying direction and capable of mounting the fish bodies, and a straight thin sheet member or a linear member disposed at a predetermined position along the head-tail direction of the fish bodies into which the pectoral fins of the fish bodies are inserted. The pectoral fins of the fish bodies are hooked at least on either the sheet member or the linear member so as to position the fish bodies in the head-tail direction.

The invention, moreover, relates to an apparatus for collecting roe of which the gripping and conveying means possesses at least one pair of conveying members for gripping and conveying the belly portion of a fish body, with plural members for holding the fish body projecting from opposite sides of the conveying members.

The invention furthermore relates to an apparatus for collecting roe wherein the abdomen pressing means includes an abutting member disposed upstream of and immediately before the the chopping means so as to press the abdomen of the fish body, near the root of the pectoral fin, toward the dorsal side of the fish body. The ovaries are then pressed down toward the caudal side of the fish body within the abdominal cavity. The abdomen pressing means may be oscillatably supported upstream or downstream of the conveying route, and elastically thrust upstream with respect to the conveying direction.

The invention further relates to an apparatus for collecting roe wherein the roe collecting means comprises a pressing member able to approach and move away from the abdomen of a fish body, and possesses a rotational axis line crossing the conveying route of the conveying means. A means is provided for rotationally driving the pressing member in the direction opposite to the running direction of the fish body. A means for thrusting then elastically thrusts the pressing member in the direction approaching the abdomen of the fish body.

According to the invention, the decapitated fish body is conveyed by the gripping and conveying means in a fixed position, held by the stopping means. The roe collecting means is disposed at a position so as to abut against the abdomen of the fish body along the conveying route, and the abdomen of the fish body is elastically pressed in the upstream direction while the roe collecting means is rotated.

Also according to the invention, the fish body is gripped and conveyed by the gripping and conveying means in a lying position, with the abdomen directed downstream, in the conveying direction. Along the path of the gripping and conveying means is provided the means for pressing the abdomen. The abdomen, near the pectoral fin of the fish body being conveyed, is elastically pressed in the upstream direction, and the ovaries are dislocated toward the caudal side of the fish body within the abdominal cavity. While the abdomen is being pressed by this abdomen pressing means, the head of the fish body is chopped off near the root of the pectoral fin by the chopping means. At this time, since the ovaries are dislocated toward the caudal side, the risk of damage to the ovaries by the chopping means is avoided. The decapitated fish body, after the head is chopped off, is elastically pressed at the caudal side of the abdomen by the roe collecting means, and the ovaries are pushed out of the abdominal cavity.

According to the invention, moreover, the fish body is conveyed in a lying position, with the abdomen directed downstream, in the conveying direction, by the positioning and conveying means disposed upstream of the gripping and conveying means. Fish bodies are mounted on plural mounting members arranged in the conveying direction, and are hooked on one of a straight thin sheet member or a linear member, disposed at a predetermined position in the head-tail direction of the fish bodies along the fish body conveying route, and the fish bodies are thus properly positioned in the head-tail direction. Therefore such positioning operation can be done without resort to manual labor, and the overall working efficiency is enhanced. Furthermore, regardless of the size of the fish body, the distance between the area of the root of the pectoral fin and the ovaries in the abdominal cavity of the fish body is nearly constant, so that accurate positioning of the fish bodies is possible regardless of the size of the fish body.

Furthermore according to the invention, in the gripping and conveying means, plural fish body linkage members project from opposite sides of the conveying members for gripping the belly portion of the fish bodies, so that the fish bodies are prevented from being dislocated undesirably by the pressing force of the cutting means even in the cutting operation by the roe collecting means.

According to the invention, in addition, at the abdomen pressing means, disposed along the path of the gripping and conveying means, the abdomen, near the root of the pectoral fin of the fish body, is pressed toward the dorsal side of the fish body with the abutting member elastically thrust upstream, with respect to the conveying direction of the fish body. In this way, regardless of the stem bones and brachial bones of the fish body that define the abdominal cavity, the ovaries in the abdominal cavity can be securely moved to the caudal side of the fish body.

Furthermore, according to the invention, the pressing member, after the fish body has its ovaries moved to the caudal side of the fish body in the abdominal cavity, is elastically thrust in the direction approaching the abdomen of the fish body by the thrusting means. The caudal side of the abdomen of the decapitated fish body is then pressed by the pressing member rotating in the direction opposite of the running direction of the fish body by the driving means, so that the ovaries are pushed out.

In this invention, as described herein, the abdominal region of the decapitated fish body is elastically pressed by the roe collecting means to force out the eggs, so that the roe can be collected smoothly. Since the invention is so designed as to position the fish bodies in the head-tail direction individually with respect to the area of the root of the pectoral fin, grip and convey in a lying position with the abdomen directed in the downstream direction, chop off the head while pressing the abdomen with the abdomen pressing means, and force out the ovaries with the roe collecting means, the roe can be collected accurately and in a short time, without damaging the ovaries and regardless of the size of the fish body.

The positioning means can accurately position in the lengthwise direction by hooking the root of the pectoral fin of the fish body to the straight thin sheet member or the linear member.

The conveying means can convey accurately without allowing the fish body to slip off or be changed in position, because plural fish body stopping members are projected on the opposite surfaces of the upper and lower conveying members.

The abdomen pressing means pushes down the ovaries toward the caudal side of the fish body in the abdominal cavity just before chopping off the head, so that the ovaries will not be cut or damaged when decapitating the fish body.

In the roe collecting means, the pressing member approaching or moving away from the abdomen of fish body rotates in the direction opposite to the conveying direction of the fish body, and the abdomen of the fish body is pressed by the elastic force, in a direction approaching the abdomen of the fish body, of the thrusting means, so that the ovaries may be accurately forced out.

BRIEF DESCRIPTION OF THE DRAWINGS

The above and other objects of the invention, as well as the features and advantages thereof, will be better understood and appreciated from the following detailed description taken in conjunction with the drawings, in which.

DETAILED DESCRIPTION OF THE PREFERRED EMBODIMENTS

Referring to the drawings, some of the preferred embodiments of the invention are described in details below.

Figure 1:
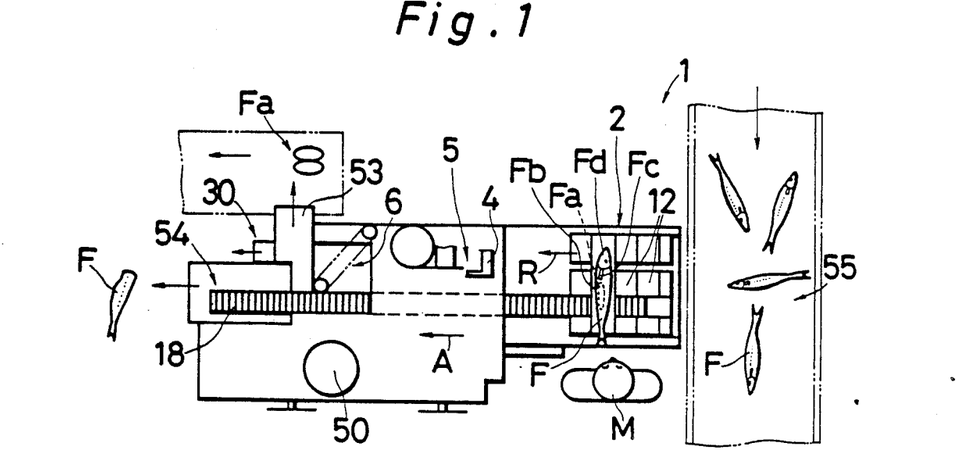
FIG. 1 is a plan view of an embodiment of the invention.
Figure 2:
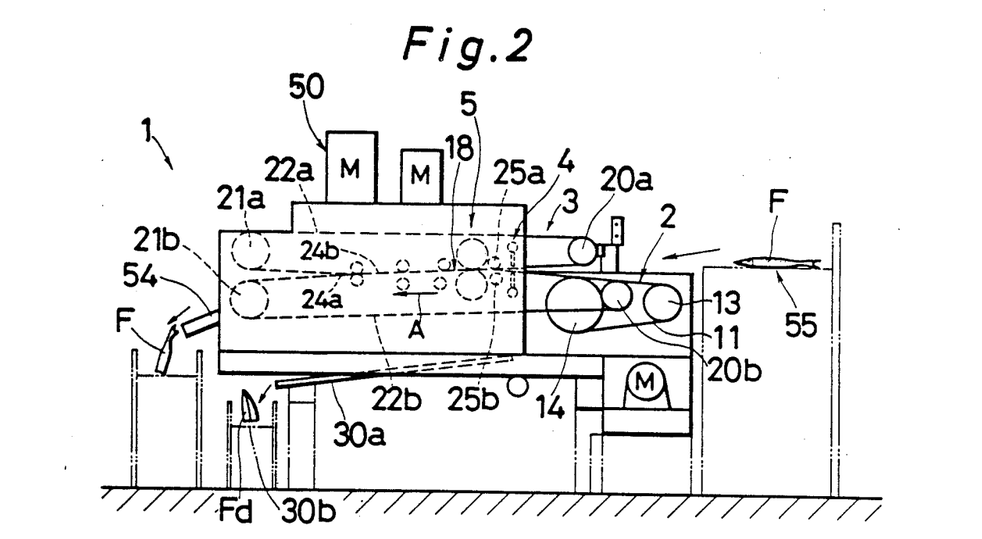
FIG. 2 is a side view of the same embodiment as shown in FIG. 1.

FIG. 1 is a plan view of an apparatus for collecting roe 1 in an embodiment of the invention, and FIG. 2 is its side view. In these drawings, the apparatus for collecting roe 1 comprises positioning and conveying means 2 for conveying a fish body F, which is mounted with its head side behind with respect to an operator M, in a lying position, with its abdominal side directed downstream with respect to the conveying direction, while correctly defining and positioning the fish body F in the head-tail direction. Gripping and conveying means 3 is connected to the positioning and conveying means 2 for receiving the fish body F from the positioning and conveying means 2 to transfer the fish downstream. Abdomen pressing means 4 is disposed along the path of the gripping and conveying means 3 to press the abdomen Fb of the fish body F to shift the ovaries Fa in the abdominal cavity to the caudal side of the cavity. Chopping means 5 is disposed along the path of the conveying means 3 for chopping off the head Fd near the root of the pectoral fin Fc, and roe collecting means 6 is disposed along the path of the conveying means 3 for pushing out the ovaries Fa from the fish body F.

Figure 3:
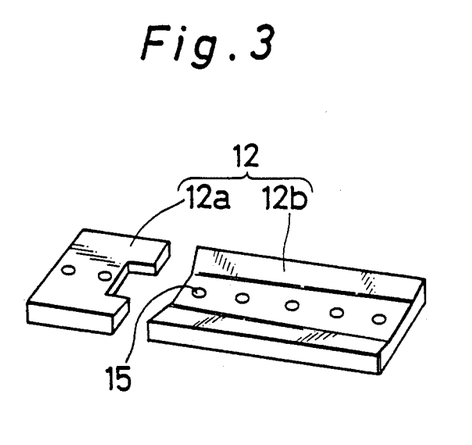
FIG. 3 is a perspective view of a fish mounting sheet body.

At the positioning means 2, as shown in the perspective view in FIG. 3, sheet bodies 12 for mounting the fish body F are arranged on a charging conveyor 11 at equal intervals, with their longitudinal directions facing at a right angle to a conveyor running direction R, the conveyor being stretched between a starting end pulley 13 and a finishing end pulley 14. The structure of this sheet body 12 is formed in a concave shape so that the fish body F may be mounted in a lying position, and it is, on the whole, a rectangular plate, being divided into a first segment 12a for mounting the head Fd and a second segment 12b for mounting the belly, and these segments 12a and 12b are integrally coupled at a clearance of about 10 mm.

Figure 13:
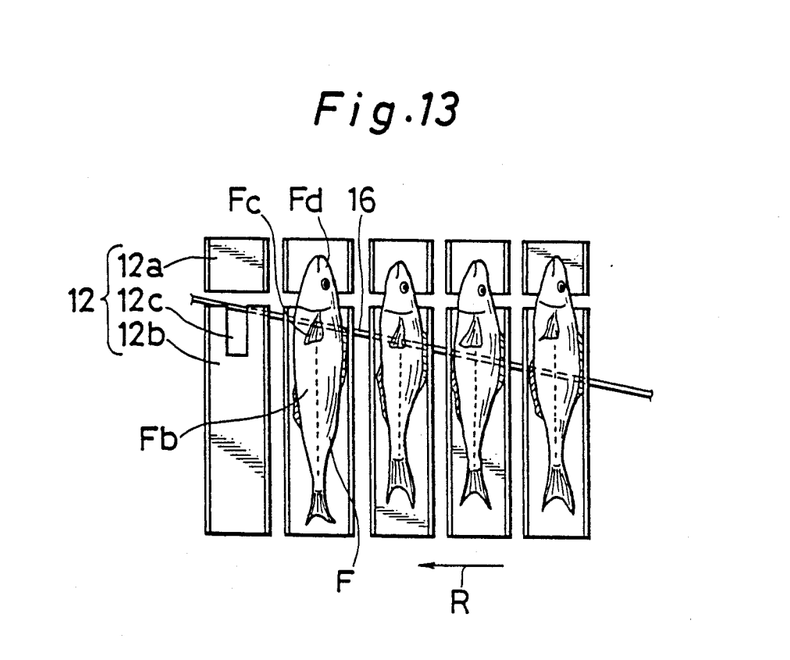
FIG. 13 is a magnified plan view of an essential part of the charge conveyor.

The end face 15 fronting on the first segment 12a side of the second segment 12b is formed thinly so as to be easy to insert between the pectoral fin Fc of the fish body F and the belly of the fish body F so as to be hooked around the root part. The positioning and conveying means 2 may also have a notch 12c for allowing the pectoral fin Fc of the fish body F to invade, disposed near the end of the fist segment 12a side of the second segment 12b, as shown in FIG. 13. A piano wire 15 approaches the first segment 12a side while running along the forwarding direction of the conveyor 11 and is stretched between the first and second segments 12a and 12b, and may replace the end face 15.

Again in FIG. 2, as the gripping and conveying means 3, a pair of upper and lower conveying belts 18 for conveying by gripping the belly of the fish body F are formed, and in order to prevent escape of the fish body F, as required, a pair of head feed belts 19, discussed below, for conveying by gripping the fish body F from top and bottom may be provided.

Figure 4:
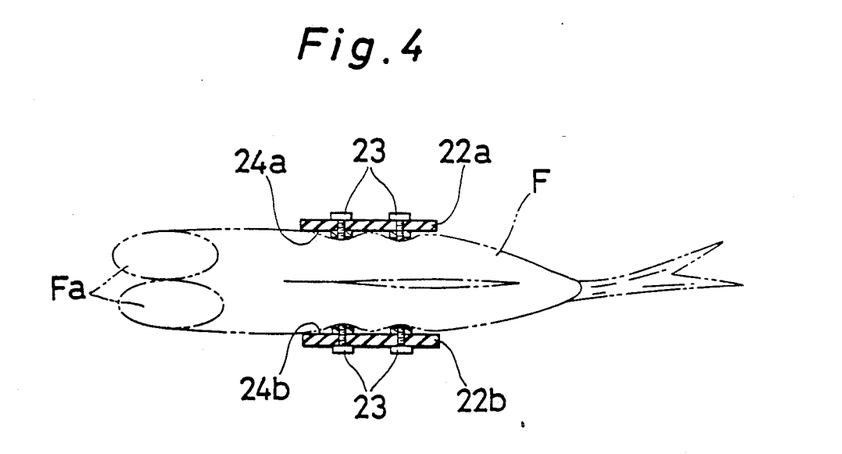
FIG. 4 is a magnified sectional view of a conveying belt.

The conveying belt 18 possesses a pair of start end side pulleys 20a and 20b rotated and driven in the direction of arrow A about a horizontal rotation axial line, and a pair of finish end side pulleys 21a and 21b rotating by following pulleys 20a and 20b. Pulleys 21a and 21b are wound with endless belt bodies 22a and 22b, made of flexible material such as rubber. On the opposing faces of the belt bodies 22a and 22b, multiple stopping needles 23 are planted, and gripping faces 24a and 24b for gripping the vicinity of the belly of the fish body F are formed. The stopping needles 23 are, for example, made of relatively small bolts as shown in FIG. 4, and the shaft of the bolts penetrate through the belt bodies 22a and 22b to be engaged with nuts so as to be fixed from the back side toward the face side of the gripping faces 24a and 24b.

The tips of the shafts of these bolts abut against the skin of the fish body F, and the friction between the fish body F and the gripping faces 24a and 24b is increased, the fish body F is then securely gripped so as not slip out of the gripping faces 24a and 24b, and it is conveyed smoothly. Incidentally, the belt bodies 22a and 22b are disposed in pair to the dorsal side so that the gripping faces 24a and 24b may approach toward each other, and are elastically pressed by plural rollers 25a and 25b, which are thrust in the mutually approaching directions by springs, which are not shown. According to this embodiment, the upper belt body 22a is suspended from the middle of the lower belt body 22b, and the start end pulley 20a is disposed on the same vertical line of the finish end pulley 14 of the charge conveyor 11.

Figure 5:
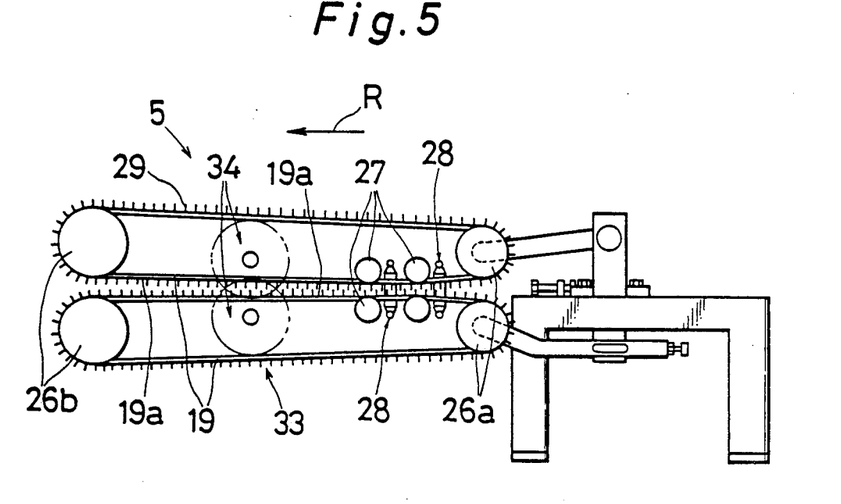
FIG. 5 is a side view of a head feed belt.

A pair of head feed belts 19 are, as shown in FIG. 5, respectively supported by a pair of start end side pulleys 26a having axes on the same vertical line as the axial line of the finish end pulley 14 of the charge conveyor 11, and a pair of finish end side pulleys 26b disposed downstream in the conveying direction R of the chopping means 5, thereby holding the fish body head Fd side of the fish body F, rather than a rotary circular cutter 34 of the chopping means 5. Each head feed belt 19 is provided with plural guide rollers 27 and springs 28 so as to approach the mutually opposing gripping faces 19a of the upper and lower head feed belts 19, and is also furnished with similar stopping needles 29, as in the gripping and conveying belt 18. The belt width is selected to be narrower than the gripping and conveying belt 18. Beneath the head feed belts 19, a head discharge chute 30a is installed at an inclination, and a refuse conveyor 30b is installed at the end of the chute 30a.

Figure 6:
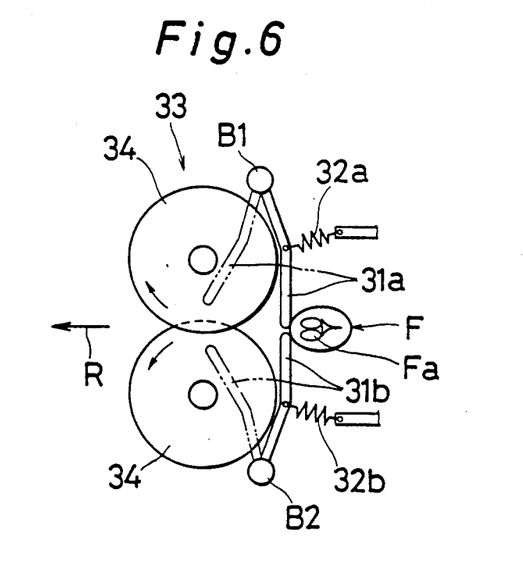
FIG. 6 is a magnified side view of abdomen pressing means.

The abdomen pressing means 4 and chopping means 5 are disposed close to each other so that the head may be chopped off simultaneously with the pressing abdomen. The abdomen pressing means 4 is, as shown in FIG. 6, located immediately before, in the conveying direction, the chopping means 5, and the ovaries Fa are pushed down toward the caudal side of the fish so that the ovaries Fa in the fish body F may not be damaged when chopping off the head. The abdomen pressing means 4 has an abutting member 31 composed of a thin plate upper member 31a and a lower member 31b for gripping the abdomen Fb near the root of the pectoral fin Fc of the fish body F from above and below the conveying belt 18, with each free end being close to the other. The abutting means 31, with mutually approaching ends opposite to the conveying route of the fish body F, is free to oscillate about fixed end parts B1 and B2 as fulcrums, and is elastically thrust in the reverse direction of the conveying direction R by springs 32a and 32b. When a rotating roller is installed at the front end of the abutting member 31 abutting against the fish body F, a smoother abdomen pressing operation can be expected.

The chopping means 5 may have a pair of upper and lower cutters 33, possessing rotary circular cutting edges 34.

Figure 7:
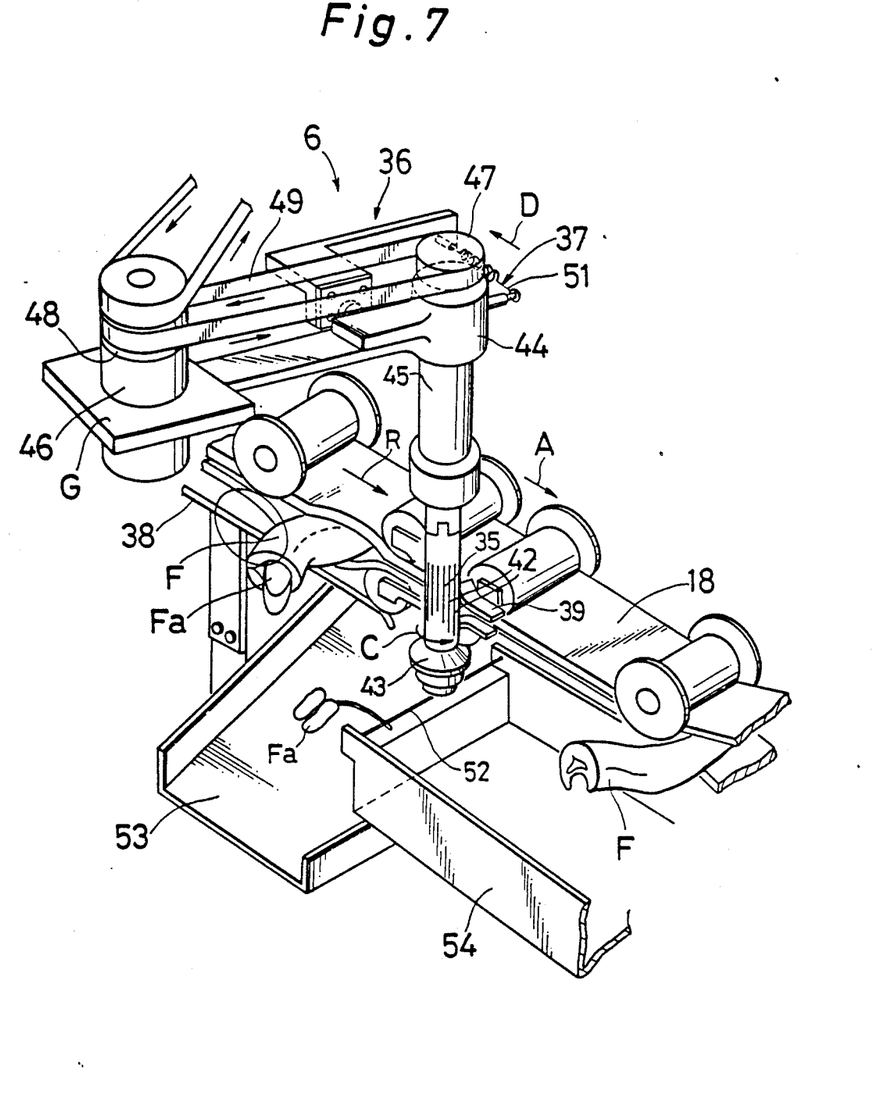
FIG. 7 is a perspective view of roe collecting means.

The roe collecting means 6 is installed downstream, in the conveying direction R, of the chopping means 5, and possesses a rotation axis near vertical to the conveying route of the fish body F as shown in perspective view in FIG. 7. A pressing member 35 is arranged movably so as to be able to approach and move away from near the anus of the abdomen Fb of the fish body F. A driving means 36 rotates the pressing member 35 in the reverse direction of the conveying direction R of the fish body F. A thrusting means 37, such as a coil spring, thrusts the pressing member 35 in the direction of the approaching abdomen of the fish body F. A guide rail 38 supports the abdomen Fb projecting from the conveying belt 18 of the fish body F from below and guides the fish body F to a position adjacent the pressing member 35. A back guide 39 is disposed between the pressing member 35 and conveying belt 18 for retaining the fish body F in a straightened state in the head-tail direction when the pressing member 35 abuts against the fish body F, and for retaining the fish body F from above and below so that the back-abdomen direction of the fish body F may orthogonally cross the axial line direction of the pressing member 35.

The pressing member 35 is mounted so that its base end part may have the same rotation axial line as a pulley 47 discussed below. Multiple lengthwise slots 42 are formed circumferentially along the outer circumference of the lower part of the pressing member 35. The free end of the pressing member 35 is a large-diameter flange, and its upward surface is a receiving face 43 for temporarily retaining the ovaries Fa pushed out by the pressing member 35. The pressing member 35 is coupled to a bearing member 44 through a coupling member 45, and is free to oscillate about a bearing member 46, mounted on a frame G or the like, within a specified angle range so as to approach or move away from the abdomen of the fish body F being conveyed along the conveying route.

The driving means 36 comprises a pulley 47 fixed coaxially on the top surface of the pressing member 35, a side pulley 48 on the bearing member, and a belt 49 stretched between these two pulleys 47 and 48, and rotates and drives the pressing member 35 in the direction of the arrow C by means of a motor 50 (see FIG. 1 and FIG. 2). In this way, by rubbing the abdomen Fb of the fish body F being conveyed in the conveying direction R reversely, the ovaries Fa are forced to be pushed out of the abdominal cavity.

A spring 51 is used as the thrusting means 37, and it elastically thrusts the pressing member 35 in a direction approaching the fish body F (the direction of arrow D). Beneath the position where the fish body F is pressed by the pressing member 35, a piano wire 52 is stretched in a direction crossing the conveying route. This piano wire 52 hooks and cuts off the ovaries Fa pushed out of the fish body F if linked to the fish body F through the intestinal tract or the like, thereby preventing the ovaries Fa from being pulled by the fish body F and being damaged.

Beneath the roe collecting means 6 there is a roe collecting chute 53 for receiving and discharging the removed ovaries Fa. The conveying belt 18 is widened into a vertical gap near its terminal end in the conveying direction as shown in FIG. 1, and a fish body discharge chute 54 is provided beneath this gap.

The manner of the operation is described below.

Figure 8:
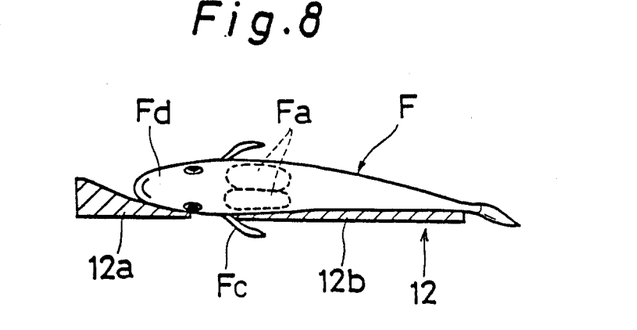
FIG. 8 is a longitudinal sectional view of a charge conveyor 11.

The fish bodies F randomly mounted and supplied on the feed conveyor 55 in FIG. 1 are picked up one by one by the operator M, and placed on the sheet body 12 of the charge conveyor 11 running at a speed of, for example, 4 m/min. For placing the fish body F on the sheet body 12, as shown in FIG. 8, the foot of the pectoral fin Fc of the fish body F is hooked on the thin end face 15 opposite the first segment 12a of the second segment 12b, as shown in FIG. 8. By this operation, the fish body F is, relating to its head-tail direction, correctly positioned in a chopping position, with respect to the chopping means 5, so that the ovaries Fa may not be damaged regardless of the size of the fish body F.

Figure 9:
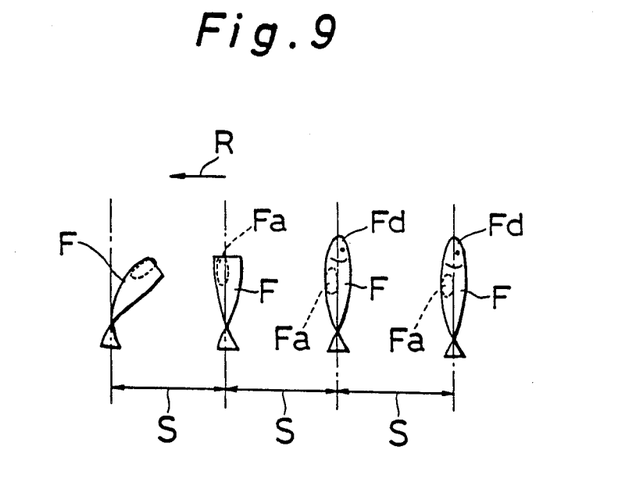
FIG. 9 is a conveying mode explanatory drawing.

Next, the fish body F is moved onto the conveying belt 18, and is forwarded while the belly is pinched between the upper and lower belt bodies 22a and 22b. The running speed of this conveying belt 18 is selected, for example, at 8 m/min. Therefore, the conveying interval of the fish bodies F is extended to twice the conveying interval of the charge conveyor 11. This conveying interval S is selected, as shown in FIG. 9, in a sufficient range so that the fish body F having its head Fb chopped off may not contact a succeeding fish body F even if pushed to the upstream side and inclined by the pressing member 35.

Figure 10:
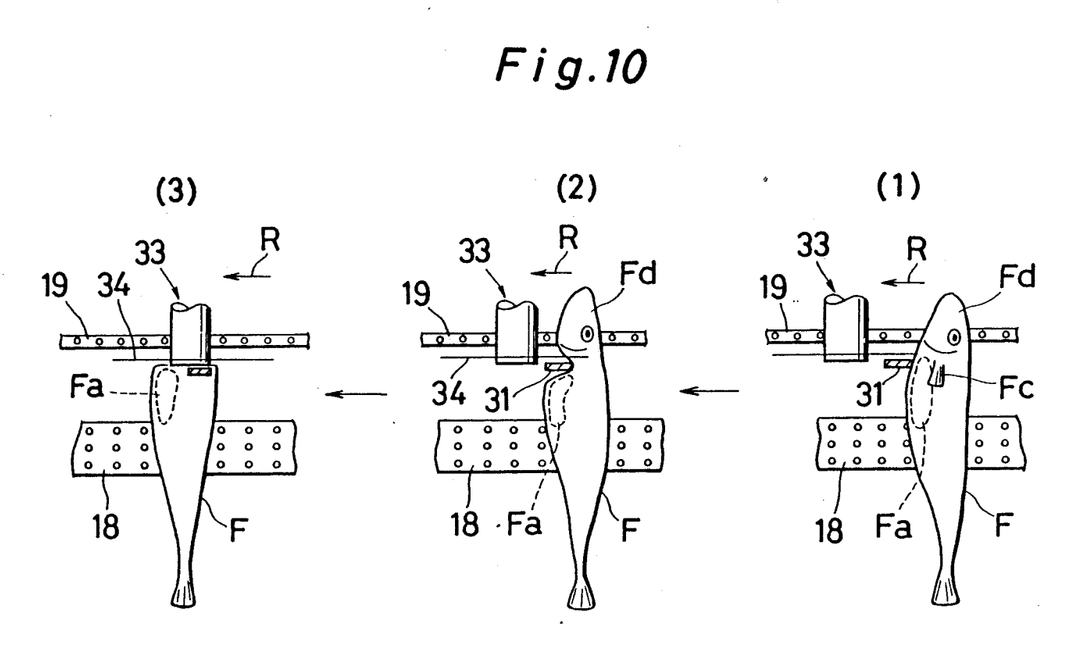
FIG. 10 is an operation state plan drawing of abdomen pressing and chopping means.

The fish body F has its head Fb pinched by the head feed conveyor 19, and has the upper part of its abdomen Fb pressed from the lateral side toward the dorsal side from the right and left sides of the fish body F by the abutting member 31 of the abdomen pressing means 4, as shown in the sequence of FIG. 10 (1), (2), and (3), and the ovaries Fa are thus pressed down to the caudal side of the fish body F while the head Fd side in the vicinity of the root of the pectoral fin Fc is chopped off by the chopping means 5. The head Fd being chopped off is carried by the head feed belt 19, and is conveyed and discharged from the head discharge chute 30a by the head discharge conveyor 30b.

The belly of the fish body F is continued to be conveyed while being pinched by the conveying belt 18, and reaches the roe collecting means 6.

Figure 11:
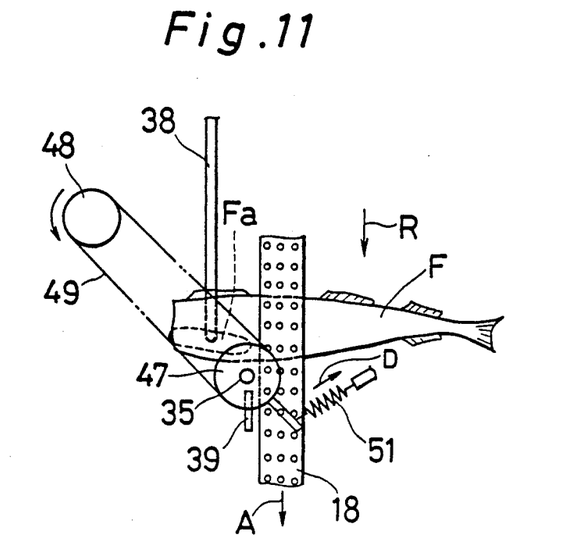
FIG. 11 is a plan view of roe collecting means 6.
Figure 12:
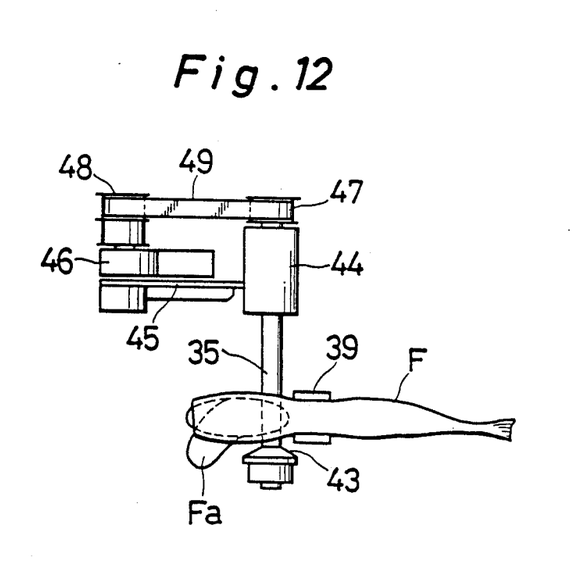
FIG. 12 is a front view of the roe collecting means 6 of FIG. 11.

In the roe collecting means 6, as shown in FIG. 11 and FIG. 12, the decapitated fish body F is supported by the guide rail 38 so that the end of the chopped side of the fish body F may not droop, and while keeping this horizontal state, the abdomen Fb abuts against the pressing member 35. At this time, the pressing member 35 is elastically thrust in the direction of arrow D (FIG. 7) by the spring force of the spring 51. In such a state, the fish body F is conveyed in the conveying direction A by the conveying belt 18. Accordingly, the ovaries Fa are forced out, and when the ovaries Fa are partly forced out, they are temporarily supported by the receiving plane 43, so that the whole block will be smoothly drawn out without being crushed.

This withdrawal action is also assisted by the rotation of the pressing member 35, while the intestinal tract and other organs linking the ovaries Fa and the fish body F are cut off by the edge of the slot 42 on the outer circumference of the rotating pressing member 35. That is, with the slot 42, the ovaries Fa are easily separated from the fish body F. Even if the ovaries Fa are linked with the intestinal tract or the like, they can still be separated by being hooked with the piano wire 52.

After discharging the eggs, the pressing member 35 is pressed by the fish body F along with the progress of the fish body F resisting the spring force of the spring 51, and oscillates and retreats in the reverse direction of direction D, so that pressing of the fish body F will not be disturbed.

The removed ovaries Fa are dropped and put into the roe collection chute 53, and the remaining fish body F is discharged out of the machine through the fish body discharge chute 54 at the terminal end of the conveying belt 18.

According to the apparatus for collecting roe 1 of this invention, the fish body F is positioned in the head-tail direction by the pectoral fin Fc, the abdomen is pressed by the abutting member 31, the head Fd is chopped off, and then the ovaries Fa are pushed out by the rotating pressing member 35 while keeping the fish body F in the horizontal position with the guide rail 38 and back guide 39, so that the ovaries Fa may be securely and promptly taken out without being damaged.

Figure 14:
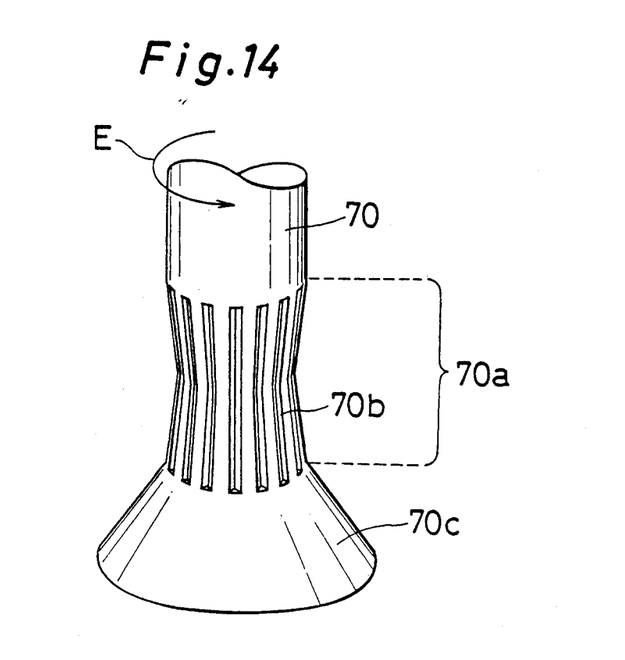
FIG. 14 is a perspective view of another embodiment of pressing member.

A pressing member 70 of another embodiment relating to the pressing member 35 shown in the perspective view in FIG. 14 comprises a concave portion 70a and a V-groove 70b, and a circular truncated cone part 70c is formed at the lower end in order to rotate in the direction of arrow E. With this concave part 70a, the abdomen Fb of the fish body F is pressed in the horizontal state by the pressing member 70 without being bent in the vertical direction or deflected around the head-tail direction. The V-groove 70b acts to separate and cut off the ovaries Fa easily from the stomach, intestine and other organs when removing them from the abdominal cavity.

In a further different embodiment of the invention, the pressing member, in another shape than the shape of the pressing members 35 and 70 in the preceding embodiments such as an S-shaped bar or hook, may be properly selected and used.

In the foregoing embodiments, the conveying speed of the conveying belt 18 is faster than the conveying speed of the charge conveyor 11, and a discharging of fish meat at the dorsal side of the head of the fish body F together with chopping of the head may be prevented, so that the collected yield of fish meat will be enhanced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and the range of equivalency of the claims are therefore intended to be embraced therein.

I claim:

1. An apparatus for collecting roe, comprising:
   conveying means for gripping and conveying decapitated fish bodies in a lying position, with the tails of the fish bodies extending in a common direction and with the abdomens of the fish bodies facing downstream with respect to the direction of conveyance of said conveying means for gripping and conveying, said conveying means for gripping and conveying comprising stopping means for holding the fish bodies stationary in said lying position; and
   collecting means for collecting roe from the fish bodies conveyed by said conveying means, said collecting means comprising a collecting member for abutment against the abdomens of the fish bodies, said collecting member being rotatable about a rotation axis extending across the direction of the conveyance of said conveying means, and said collecting member being elastically biased upstream with respect to said direction of conveyance.

2. An apparatus for collecting roe as set forth in claim 1, and further comprising:
   said conveying means gripping and conveying said fish bodies prior to decapitation thereof in said lying position with the abdomens of the fish bodies facing downstream with respect to said direction of conveyance and with the pectoral fin root areas of the fish bodies positioned at a predetermined cutting position with respect to the head-to-tail direction of the fish bodies;
   pressing means for elastically pressing the abdomens of the fish bodies conveyed by said conveying means in the upstream direction with respect to said direction of conveyance so as to press the abdomens of the fish bodies near the pectoral fins thereof to dislocate the ovaries in the fish bodies toward the tail ends of the fish bodies within their abdominal cavities;
   cutting means for cutting off the heads of fish bodies conveyed by said conveying means at the pectoral fin root areas of the fish bodies while the abdomens of the fish bodies are being pressed by said pressing means; and
   said collecting member of said collecting means elastically biased upstream being disposed adjacent said conveying means downstream of said cutting means with respect to said conveying direction and abutting the abdomen of a decapitated fish body at the tail end thereof to remove the ovaries therefrom.

3. The apparatus for collecting roe as set forth in claim 2, and further comprising:
   positioning and conveying means for mounting, positioning and conveying the fish bodies in said lying position with the abdomen thereof facing downstream in the conveying direction, said positioning and conveying means comprising a plurality of mounting members disposed along the conveying direction for mounting fish bodies thereon and at least one of a straight thin sheet member and a linear member disposed at a predetermined position with respect to the head-to-tail direction of the fish bodies when mounted on said mounting members in said lying position for receiving the pectoral fins of the fish bodies, wherein the pectoral fins of the fish bodies are hooked on at least one of said straight thin sheet member and said linear member to properly position the fish bodies in the head-to-tail direction.

4. The apparatus for collecting roe as set forth in claim 2, wherein:
   said conveying means comprises at least one pair of conveying members for gripping and conveying the belly portions of the fish bodies; and
   said stopping means comprises a plurality of projecting members projecting from respective opposite sides of said conveying members.

5. The apparatus for collecting roe as set forth in claim 2, wherein: said pressing means comprises an abutting member disposed immediately upstream of said cutting means, said abutting member being pivotably mounted along the conveying path of said conveying means and elastically biased upstream with respect to the conveying direction.

6. The apparatus for collecting roe as set forth in claim 2, wherein said collecting means further comprises:
   means for rotatably driving said collecting member in a direction opposite to the conveying direction of said conveying means; and
   means for elastically biasing said collecting member upstream toward the abdomen of a fish body approaching on said conveying means.

* * * * *